(12) United States Patent
Kisaka et al.

(10) Patent No.: US 6,754,021 B2
(45) Date of Patent: Jun. 22, 2004

(54) SHOCK RESISTANT, HIGH RELIABILITY ROTATING MAGNETIC STORAGE DEVICE

(75) Inventors: Masashi Kisaka, Yokohama (JP); Yutaka Ozawa, Fujisawa (JP); Kenji Toga, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 09/813,081

(22) Filed: Mar. 19, 2001

(65) Prior Publication Data

US 2001/0026413 A1 Oct. 4, 2001

(30) Foreign Application Priority Data

Mar. 28, 2000 (JP) ........................................ 2000-089857

(51) Int. Cl.⁷ .............................................. G11B 19/04
(52) U.S. Cl. .............................. 360/60; 360/69; 360/75
(58) Field of Search .............................. 360/60, 69, 75; G11B 19/04

(56) References Cited

U.S. PATENT DOCUMENTS

| | | | | |
|---|---|---|---|---|
| 5,491,394 A | * | 2/1996 | Harwood et al. | ........... 318/563 |
| 6,115,200 A | * | 9/2000 | Allen et al. | ................. 360/60 |
| 6,429,990 B2 | * | 8/2002 | Serrano et al. | ............... 360/60 |

FOREIGN PATENT DOCUMENTS

| | | | | |
|---|---|---|---|---|
| JP | 61-003359 | | 1/1986 | .......... G11B/19/04 |
| JP | 61-79869 | | 5/1986 | .......... G11B/19/04 |
| JP | 62-089269 | | 4/1987 | .......... G11B/19/04 |
| JP | 63-195666 | | 12/1988 | .......... G11B/19/02 |
| JP | 01-116953 | | 8/1989 | .......... G11B/19/02 |
| JP | 01-229454 | | 9/1989 | .......... G11B/19/02 |
| JP | 01-273265 | | 11/1989 | .......... G11B/19/02 |
| JP | 01-279457 | | 11/1989 | .......... G11B/19/02 |
| JP | 03-252962 | | 12/1991 | .......... G11B/19/02 |
| JP | 04-268254 | | 9/1992 | .......... G11B/19/22 |
| JP | 07-201124 | | 8/1995 | .......... G11B/19/04 |
| JP | 11126412 A | * | 5/1999 | .......... G11B/19/04 |
| WO | WO 94/11874 | * | 5/1994 | .......... G11B/19/04 |

* cited by examiner

Primary Examiner—David Hudspeth
Assistant Examiner—Dan I. Davidson
(74) Attorney, Agent, or Firm—Silicon Valley IP Group, PC; Dominic M. Kotab

(57) ABSTRACT

A rotating storage apparatus is provided for high recording reliability in an environment in which a shock or vibration exists. Provided are means for outputting a shock out signal (SO) if an output from an acceleration sensor exceeds a predetermined threshold, a latch circuit 21 for outputting a latch signal at high level during a predetermined write inhibit period after the shock out signal (SO) is input, and a write gate signal (WG) which goes high when a write is enabled. A write enable signal is generated by an AND circuit 23 having a NOT output of the latch signal as well as the write gate signal WG as its inputs.

11 Claims, 6 Drawing Sheets

[Figure 1]
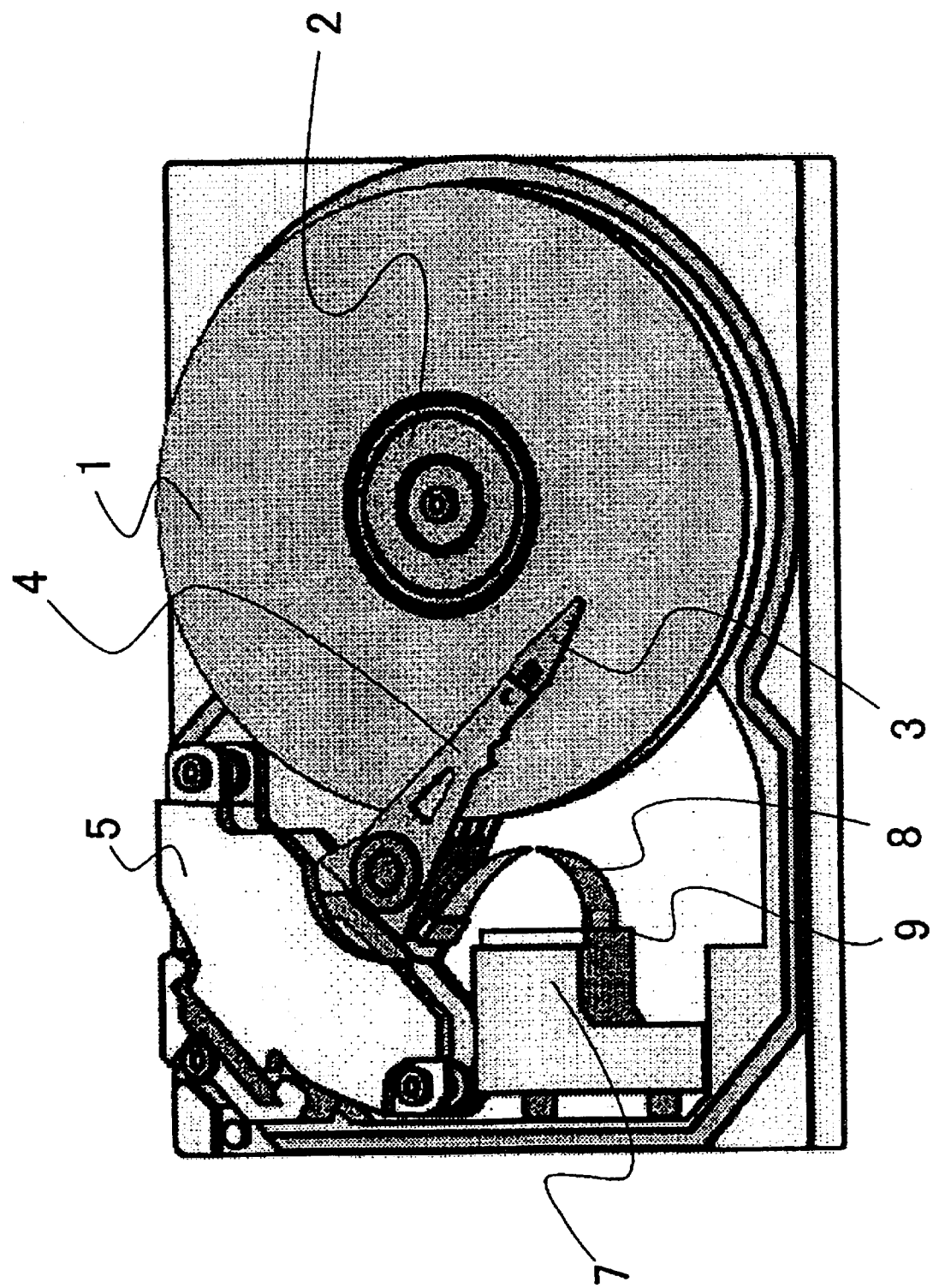

[Figure 2]
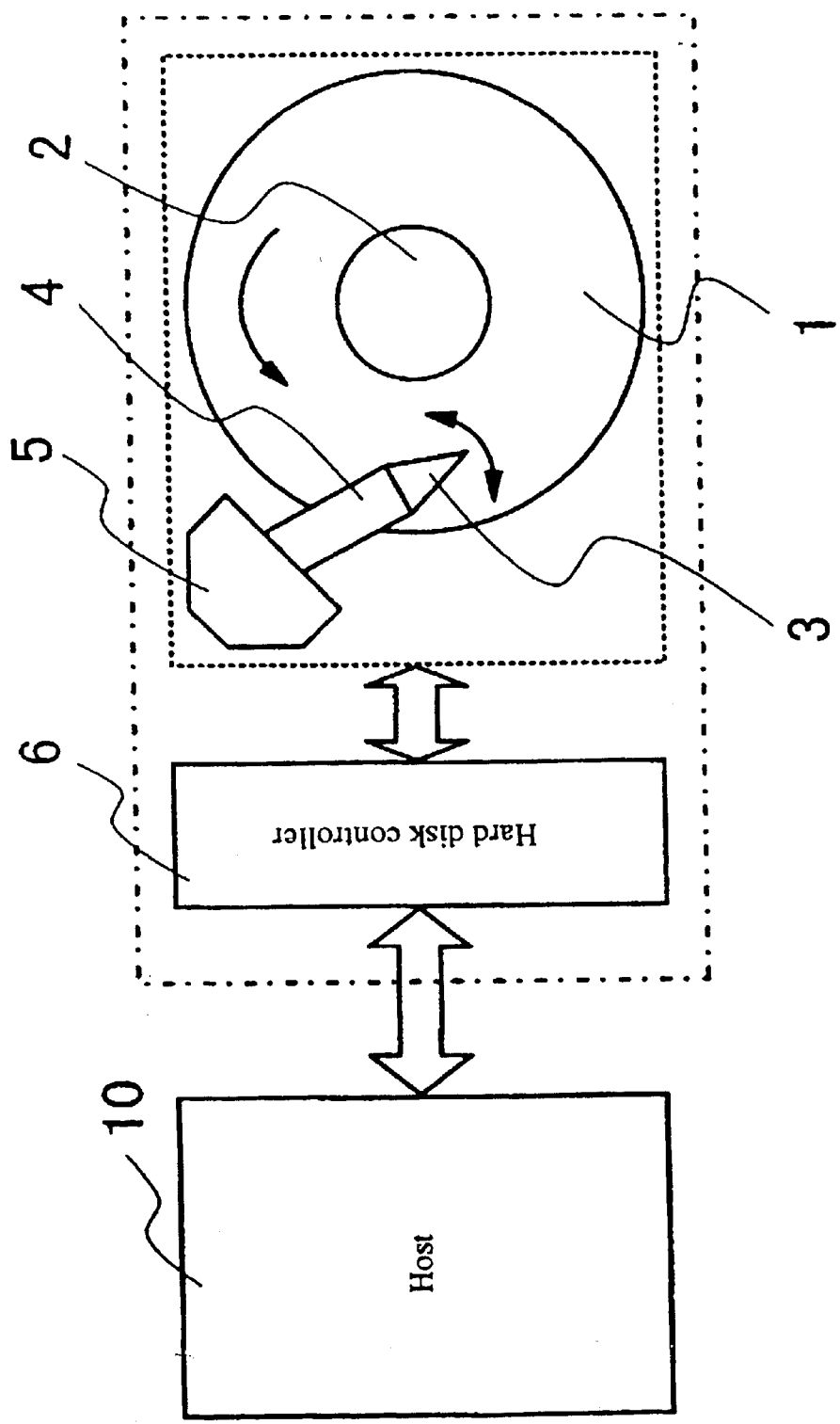

[Figure 3]
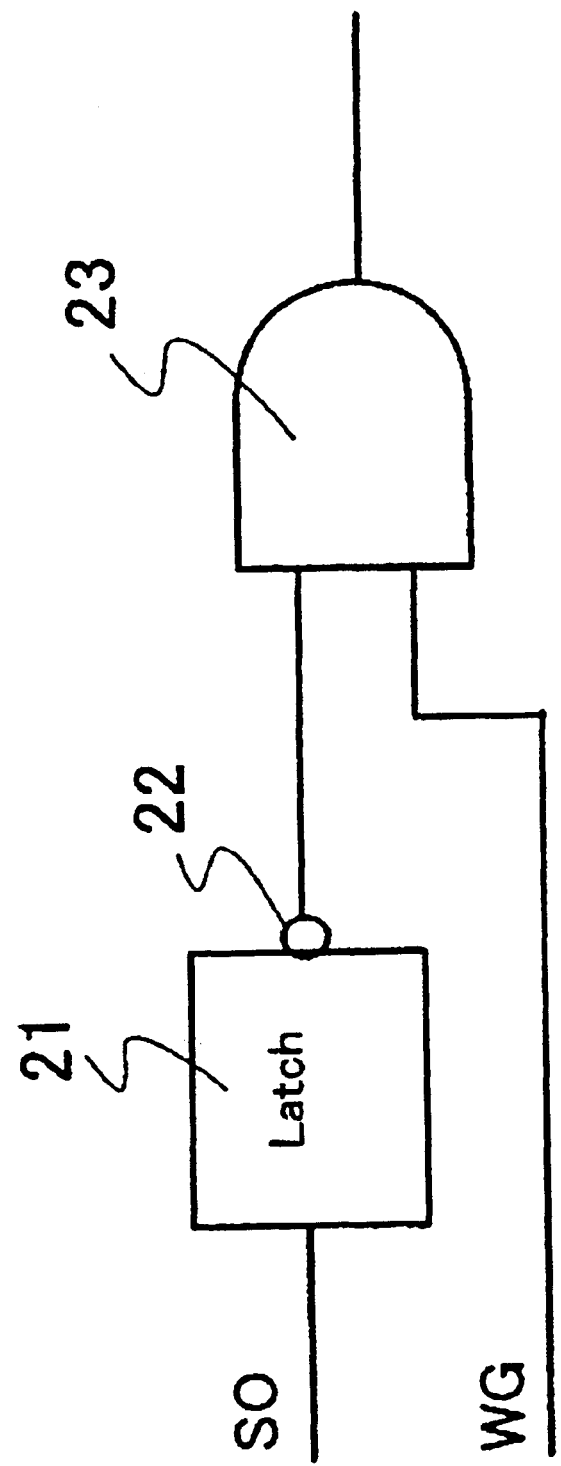

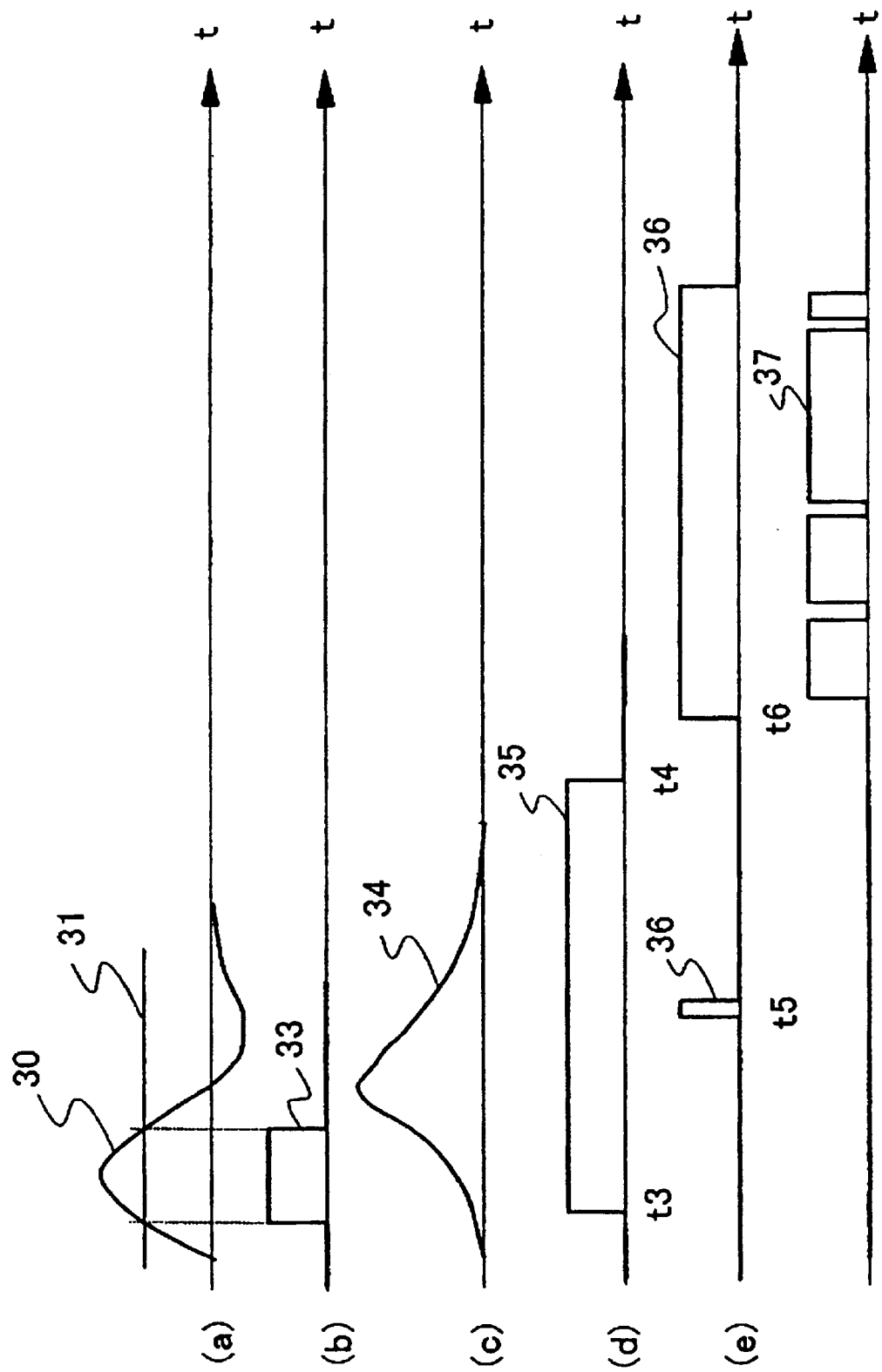
[Figure 4]

[Figure 5]
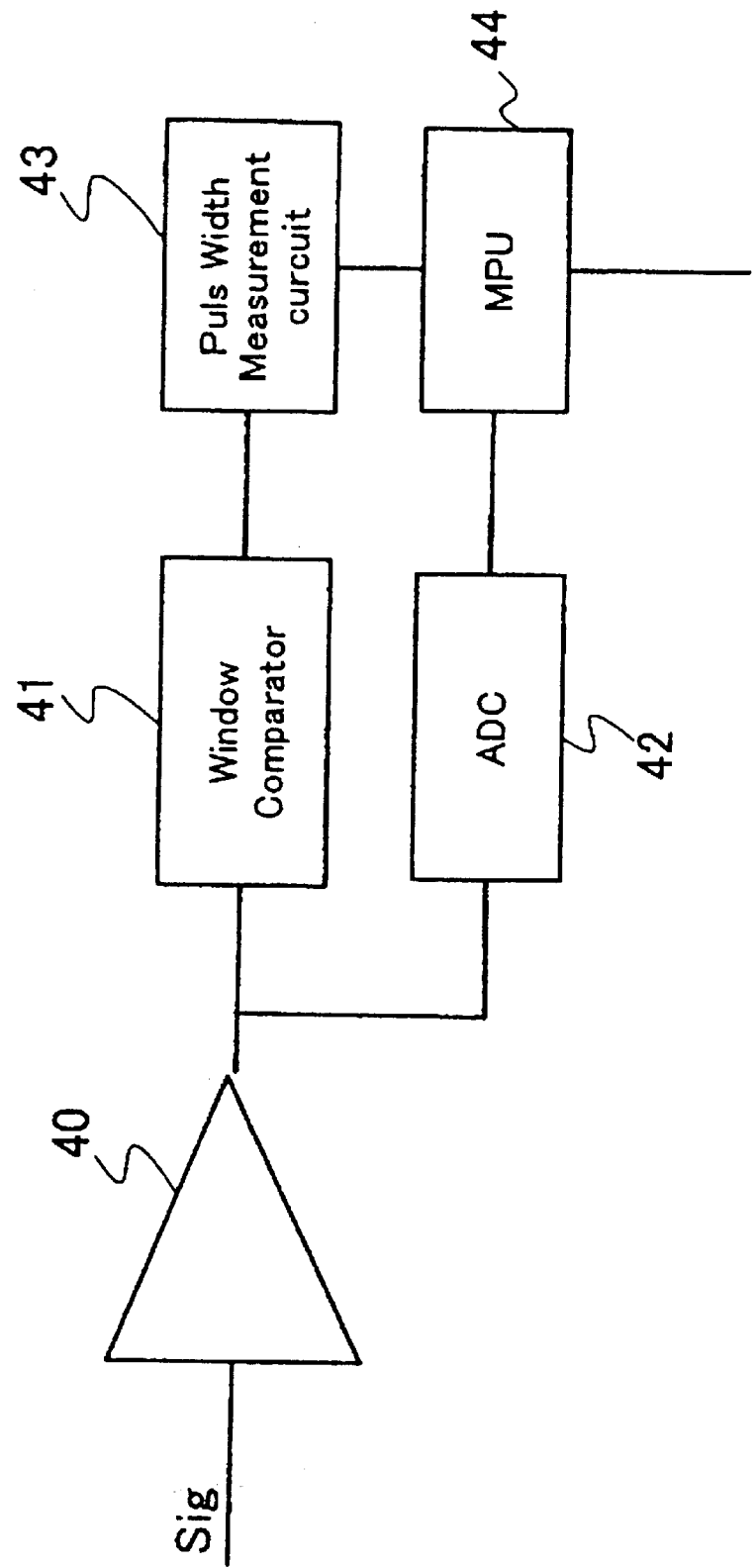

[Figure 6]
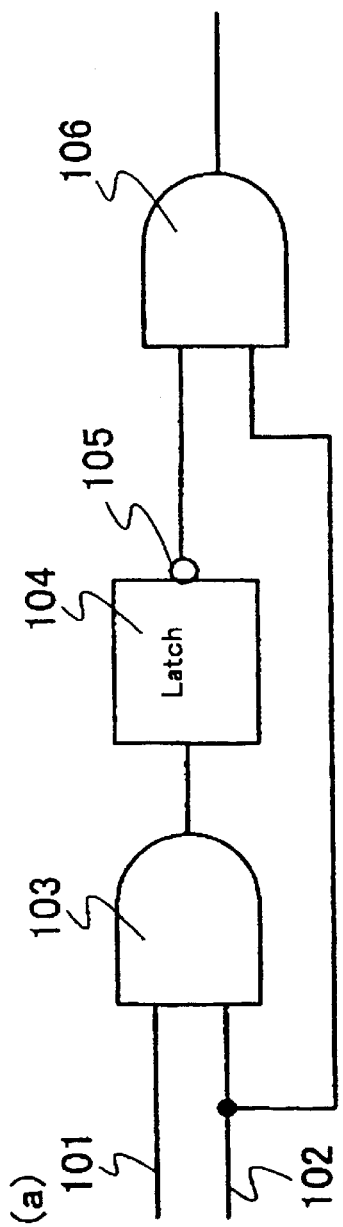
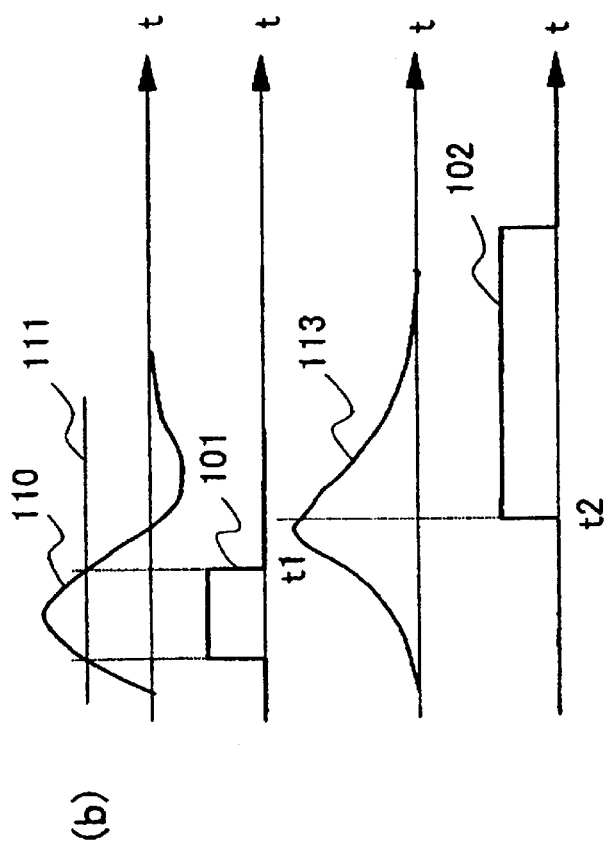

SHOCK RESISTANT, HIGH RELIABILITY ROTATING MAGNETIC STORAGE DEVICE

BACKGROUND OF THE INVENTION

1. Field of the Invention

The present invention relates to a rotating storage apparatus and information recording method, and in particular, to protective measures against shock and vibration during the operation of information storage apparatus in which information is recorded on a rotating recording medium such as a hard disk.

2. Description of the Background Art

In recent years, information processing systems have been widely used in portable devices such as notebook personal computers. In portable devices, vibration and shock are unavoidable and protective measures against vibration and shock have become important. Improvement of shock resistance is very important especially in a storage apparatus containing a rotating recording medium such as a hard disk because it has a moving mechanism for changing relative positional relationship between a head having read/write capability and the rotating medium.

As is known to those skilled in the art, tracks are provided on a rotating recording medium (hard disk) in a hard disk drive, for example, and a head is positioned over a track to record a magnetic signal from the head in the track. If the head underwent external shock or vibration while the head is positioned over a track and information from the head is being recorded (written) in the track, the head would go off the predetermined track (off-tracking) and the information would be written in a position at a distance from the predetermined track. The information written in such an off-tracking condition may not only cause a read error but also, if information has been recorded in adjacent tracks, affect the adjacent tracks to prevent the information from being recorded correctly.

Examples of approaches for preventing information recording in an off-tracking condition includes a technology described in Published Unexamined Patent Application No. 11-126412 (Japan). The technology is described in that application which has the object of improving the performance of a rotating recording apparatus in an environment in which the apparatus undergoes a shock. In particular, the timing control is optimized for a retry operation according to the affecting magnitude of shock force or vibration. An optimum retry interval is set according to the magnitude of the shock or vibration from retry intervals stored in memory to cause a data write operation to be retried with an optimum timing if the shock or vibration is detected to halt the write operation. In this way, the number of retries or wasteful latency could be reduced compared with the case where a fixed retry latency is determined, thereby improving the performance of the apparatus.

However, the technology described in that application and other prior-art technologies have the following problems. A gravitational acceleration sensor (G-sensor) is used to detect a shock and vibration. The physical quantity detected by the G-sensor is acceleration (proportional to force) and does not exactly reflect the off-tracking amount described above. The off-tracking amount is a displacement (position) from an intended track position at which a head is to be positioned. Although a shock or vibration (force) causes the displacement of the head and therefore off-tracking, an output from the G-sensor does not directory represent the off-tracking amount. Because a position is typically represented by the double integral of force in a system in which a feedback is provided, such as the head positioning control system of a hard disc drive, an actual off-tracking amount is provided with time delay with respect to the output of the sensor. As a result, a problem arises if a pulse-like shock that is as short as the time delay is exerted, as described below. This problem will be described with reference to FIG. 6.

FIG. 6A shows a logic circuit diagram for explaining the problem. FIG. 6B shows a diagrammatic drawing. As shown in FIG. 6A, a shock output signal 101 (called a shock out), which is present if an output from the G-sensor exceeds a predetermined threshold, is referenced when a write gate signal 102 is asserted (goes high). When both of the shock out signal 101 and the write gate signal 102 are high, the output of an AND circuit 103 goes high and is latched by a latch circuit 104 for a predetermined time period and a write inhibit signal is generated. The write inhibit signal is inverted by a NOT circuit 105 and input to an AND circuit 106 to mask the write gate signal 102 (force it low). This inhibits the write operation. In other words, the shock out signal 101 is referenced only when the write gate is open and the write inhibit signal is not generated when the write gate is closed (the write gate signal 102 is low).

This will be described in time sequence with reference to FIG. 6B. Curve 110 is a waveform representing, with respect to the time-axis, an output from the G-sensor when a short pulse shock is exerted. The shock out signal 101 is continuously output in the output waveform of curve 110 while a threshold 111 is exceeded. However, unless the write gate signal 102 is asserted (high), no write inhibit signal is generated, as described above. Here, no problem would occur if the phase of the waveform 110 of the sensor output matches that of off-tracking amount at the position of the head. However, an actual off-tracking at the head position is delayed with respect to the sensor output waveform of curve 110 as shown by curve 113. If the write gate signal 102 is asserted (high) at time t2 immediately after the time (t1) at which the shock out signal 101 stops, no write inhibit signal would be generated and a write operation start because the shock out signal 101 is not high even though the head position is off-track.

The inventors of the present invention have found that the above-mentioned problem was likely to arise when a hard disk drive is installed in a portable computer which in turn is particularly susceptible to an external shock and vibration. Also the problem is more pronounced as the recording density increases. For example, the above-mentioned problem is likely to occur when the storage density is increased to about 30 ktpi or over in a typical hard disk drive of 4,200 rpm.

What is needed is a disk drive with more robust resistance to shock disturbances.

SUMMARY OF THE INVENTION

It is an object of the present invention to provide an apparatus and method of achieving high recording reliability of a rotating storage apparatus which uses a high-density storage medium, even in an environment where a shock or vibration exists. It is another object of the present invention to provide an apparatus and method that can inhibit a write operation in an off-tracking condition even in an environment where a short pulse shock or high-frequency vibration is exerted. It is yet another object of the present invention to provide an apparatus and method for an optimum write inhibit according to the magnitude of a shock or the amplitude of vibration and that can increase the writing speed as well as the reliability of the apparatus to improve the performance of the apparatus.

The outline of the present invention will be described below. The rotating storage apparatus of the present invention comprises a rotating recording medium for recording information, a head for performing at least a write operation onto the rotating recording medium, and an acceleration sensor for detecting a shock. If an output from the acceleration sensor exceeds a predetermined threshold, the write operation is inhibited during a predetermined write inhibit period regardless of the status of a write gate signal.

The rotating storage apparatus of the present invention comprises a rotating recording medium for recording information, a head for performing at least a write operation onto the rotating recording medium, and an acceleration sensor for detecting a shock. The apparatus comprises 1) means for monitoring an output from the acceleration sensor and, if the monitor output exceeds a predetermined threshold, outputting a shock out signal 2) latch means for outputting a latch signal at a first level during a predetermined write inhibit period from a time at which the shock out signal is input 3) write gate signal generation means for outputting the signal at the first level when a write permission is given and 4) a logic enabling a write onto the rotating recording medium when the latch signal is at a second level other than the first level and when the write gate signal is at the first level.

The information recording method of the present invention is a method for recording information in a rotating storage apparatus comprising a rotating recording medium for recording information, a head for performing at least a write operation onto the rotating recording medium, and an acceleration sensor for detecting a shock. The method comprises 1) outputting a shock out signal if an output form the acceleration sensor exceeds a predetermined threshold 2) outputting continuously a signal at a first level during a predetermined write inhibit period in response to the input of the shock out signal 3) generating a logical AND signal of a logical negation signal at a first level and a write gate signal output, the write gate signal becomes the first level when a write permission is given and 4) enabling a write onto the rotating recording medium when the logical AND signal is at the first level.

According to the above-described rotating storage apparatus or information recording method, a write inhibit signal is generated at the time when a shock out signal is detected, regardless of the status of the write gate. The write inhibit signal is referenced and if the apparatus is in the write inhibit state, a write gate signal is masked (negated, goes low). The period (write inhibit period) during which the write inhibit signal is continuously output after the shock out signal is detected is predetermined by taking the characteristics of the apparatus into account, and in addition, changed by referencing the width of the output signal or the peak value of the acceleration sensor. This ensures that the write inhibit signal is generated to inhibit a write operation in an off-tracking condition whenever the head is in the off-tracking condition in an environment in which a short pulse-like shock or high-frequency vibration is exerted on the apparatus. Thus, the information recording reliability of the apparatus can be increased. In addition, the write time can be reduced by selecting an optimum write inhibit duration, thereby improving the performance of the apparatus.

High recording reliability of a rotating storage medium apparatus using a high-density recording medium can be achieved even in an environment where a shock or vibration exists.

A write operation in an off-tracking condition can be inhibited even in an environment where a short pulse shock or high-frequency vibration may be exerted.

An optimum write inhibit operation can be performed according to the magnitude of a shock or the amplitude of vibration, thus improving the writing speed and performance as well as the reliability of the apparatus.

BRIEF DESCRIPTION OF THE DRAWINGS

FIG. 1 is a perspective view of an example of a hard disk drive of an embodiment of the present invention.

FIG. 2 is a block diagram showing an example of the hard disk drive of the embodiment of the present invention.

FIG. 3 is a circuit block diagram showing part of a hard disk controller.

FIG. 4 is a chart showing the timing of outputs from major parts of the circuit, the waveform of outputs of an acceleration sensor, an off-tracking amount.

FIG. 5 is a block diagram showing a circuit for determining a change of write inhibit period.

FIG. 6A is a logic circuit diagram of the prior art.

FIG. 6B is a chart for explaining the prior art.

DETAILED DESCRIPTION OF THE INVENTION

An embodiment of the present invention will be described below with reference to the accompanying drawings. However, the present invention may be implemented in many different embodiments and should not be construed as being limited to the description of the embodiment. Throughout the description of the embodiment, like elements are labeled with like numbers.

FIG. 1 is a perspective view showing an example of a hard disk drive, which is one embodiment of the present invention. FIG. 2 is a block diagram of the hard disk drive. The hard disk drive of this embodiment comprises a disc-like magnetic recording medium 1 on which information is magnetically recorded, a spindle motor 2 for driving the magnetic recording medium 1, a magnetic head 3 for recording information on the magnetic recording medium 1 or reading from information recorded on the magnetic recording medium 1, an arm 4 for supporting the magnetic head 3, a voice coil motor 5 for driving the arm 4, and a hard disk controller 6 for controlling input and output of information into and from the magnetic head 3 and the drive of the spindle motor 2 and voice coil motor 5. Data writing and reading to and from the magnetic head 3 are performed through a flexible cable 8 attached to a connector 7 and the arm 4. A gravitational acceleration sensor 9 is attached to the flexible cable 8. While the gravitational acceleration sensor 9 is shown as attached to a movable part of the flexible cable 8 in FIG. 1 for clarity, it is in practice attached to a cable connection part in the close proximity of the connector 7 so that vibration of the cable is not detected by the gravitational acceleration sensor 9.

The hard disk controller 6 interfaces to a host computer 10 and reads or writes information from or onto the magnetic recording medium 1 as magnetic information, according to a read or write request from the host computer 10.

FIG. 3 is a circuit block diagram of part of the hard disk controller 6. FIG. 4 shows a chart of the output timing from major parts of the circuit and the waveform of outputs from the gravitational acceleration sensor and the off-tracking amount of the head.

The circuit block shown in FIG. 3 consists of a latch circuit 21 for latching a shock out signal SO, a NOT circuit 22 for negating the output from the latch circuit 21, and an AND circuit 23 to which the output from the NOT circuit 22 and a write gate signal WG are provided as its inputs.

FIG. 4A is a chart showing the waveform of an output from the gravitational acceleration sensor 9 in response to a shock exerted on the drive apparatus. It is assumed that waveform 30 as shown is output when a short pulse shock is exerted. An output (shock out signal SO) 33 as shown in FIG. 4B is continuously output from the sensor during the time period in which the waveform 30 exceeds a predetermined threshold 31. The displacement (off-tracking amount) from a track position of the magnetic head 3 caused by this shock is indicated by curve 34 in FIG. 4C. The off-tracking amount (curve 34) is a physical quantity having a distance dimension and represented by a double integral as mentioned earlier, and therefore has time delay with respect to the sensor output (waveform 30).

According to the present invention, a write inhibit signal 35 is generated as shown in FIG. 4D in order to inhibit a write operation while such off-tracking exists. The write inhibit signal 35 is generated by the circuit block shown in FIG. 3. That is, the shock out signal SO is generated by shock out generating means (not shown) and input into the latch circuit 21. The output of the latch circuit 21 is held high during a predetermined time period after time t3 at which the shock out signal SO is detected (write inhibit period (t4–t3). The output signal from the latch circuit 21 is converted into low by the NOT circuit 22. In other words, during the write inhibit period, a low-level signal is input into the AND circuit 23 and the output from the AND signal 23 goes low regardless of the status of the write gate signal WG to keep the write inhibit state.

In this way, according to the present invention, a write operation is inhibited during a predetermined period (write inhibit period) after a shock out signal SO is detected, regardless of the status of the write gate WG. Thus, the write inhibit state can be kept to inhibit a write operation in an off-tracking condition even if a short pulse shock is exerted.

As shown in FIG. 4E, the output 36 (final write gate output) from the AND circuit 23 does not continuously go high (asserted) even if the write gate (WG) is asserted (goes high) at time t5 during the write inhibit period, and goes high (asserted) at time t6 by a retry after the end of the write inhibit period. The asserted state (high level) of the write gate signal 36 forces a write signal 37 onto the magnetic recording medium 1 to be output. Examples of the write signal 37 includes a synchronous signal, address signal, user data signal, and error correction code signal. The write inhibit period (t4–t3), that is, a latch period by the latch circuit 21, can be fixed in appropriate time periods by analyzing the variation characteristics of the arm 4 and other components beforehand by experiments and reflecting the results of the experiments in the determination. It has been empirically found that a period equivalent to 15 servo sectors is appropriate. Because the sampling frequency for one servo sector is 5.6 kHz, about 2.7 msec may be appropriate.

The write inhibit period may be varied in consideration of an output value from the gravitational acceleration sensor 9. FIG. 5 is a block diagram showing an example of a circuit for determining a change of write inhibit period. This circuit is contained in the hard disk controller 6, for example.

An output signal (Sig) from the gravitational acceleration sensor 9 is input into an amplifier (AMP) 40. The output of the AMP 40 is input into a window comparator 41 and an analog-digital converter (ADC) 42. The window comparator 41 outputs the high-level signal when a signal exceeding a predetermined threshold is input. The time span in which the output is held high is measured by a pulse width measurement circuit 43. The measured value is input into a micro processing unit (MPU) 44, where a write inhibit period is calculated according to the time span measured by the pulse width measurement circuit 43. A controller MPU installed in a hard disk controller 6 may also be used as the MPU 44.

On the other hand, a signal converted into a digital signal in the ADC 42 is input into the MPU 44 and the largest value (the peak value of the signal) is selected and a write inhibit period according to the peak value is calculated in the MPU 44.

The write inhibit period calculated in the MPU 44 can be input into the latch circuit 21 in FIG. 3 and the write inhibit period is set as the latch period. In this way, the write inhibit period can be varied according to the signal width or peak value of the gravitational acceleration sensor 9, thereby allowing an optimum write inhibit period to be set according to the output value of the gravitational acceleration sensor 9 by a program provided to the MPU 44. Of course, findings in experiments and studies can be reflected in the optimization of this program.

Any methods that take into account only the pulse width value, only the peak value, or both of the pulse width and peak value may be used for the calculation of the write inhibit period by the MPU 44.

While the present invention by the inventors has been described in particular with respect to the embodiment of the present invention, the present invention is not limited to the above-described embodiment. Various changes may be made to the present invention without departing from the scope and spirit of the present invention. For example, while the embodiment has been described with respect to the hard disk drive as an example of the rotating storage apparatus, the present invention is not limited to the hard disk drive. Instead, the present invention may be applied to any storage apparatus having a rotating recording medium, including a rewritable optical and magneto-optical recording apparatus such as CD-R/W, DVD, and MO drive storage apparatuses. In addition, the present invention may be applied to a removable rotating magnetic recording apparatus.

Any acceleration sensors, including a dielectric sensor such as a gyro-meter, and a semiconductor sensor may be used as the acceleration sensor 9. In addition, while the example in which the time span and peak value of the sensor output are referenced to vary the write inhibit period has been described, the sensor output waveform may be analyzed by using an appropriate method such as fast-Fourier-transform processing and the result of the analysis may be used to calculate the write inhibit period more precisely.

We claim:

1. A rotating storage apparatus, comprising:
   a rotating recording medium for recording information;
   a head for performing at least a write operation onto said rotating recording medium; and,
   an acceleration sensor for detecting a shock,
   wherein if an output from said acceleration sensor exceeds a predetermined threshold, said write operation is inhibited during a write inhibit period regardless of the status of a write gate signal,
   wherein a duration of said write inhibit period is selected based at least in part on a time span in which said acceleration sensor output exceeds said threshold.

2. A rotating storage apparatus, comprising:

a rotating recording medium for recording information;

a head for performing at least a write operation onto said rotating recording medium;

an acceleration sensor for detecting a shock;

means for monitoring an output from said acceleration sensor, and, if said monitored output exceeds a predetermined threshold, outputting a shock out signal;

a single latch means for outputting a latch signal at a first level during a write inhibit period from a time at which said shock out signal is input, wherein said write inhibit period is selected based on said output of said acceleration sensor;

a write gate signal generation means for outputting a write gate signal at the first level when a write permission is given; and a logic circuit enabling a write onto said rotating recording medium when said latch signal is at a second level other than said first level and when said write gate signal is at the first level.

3. The rotating storage apparatus according to claim 2, comprising a logic circuit for changing said write inhibit period according to a time span in which said acceleration sensor output exceeds said threshold or according to an output peak value of said acceleration sensor.

4. The rotating storage apparatus according to claim 3, wherein said rotating storage apparatus is a hard disk drive.

5. The rotating storage apparatus according to claim 2, comprising a logic circuit for calculating a duration of the write inhibit period based on a time span in which said acceleration sensor output exceeds said threshold.

6. The rotating storage apparatus according to claim 2, wherein the latch means is a single latch logic circuit, no other latch logic circuit providing signals to the logic circuit enabling the write onto the rotating recording medium.

7. The rotating storage apparatus according to claim 2, wherein the means for monitoring the output from said acceleration sensor monitors the output with respect to only one predetermined threshold.

8. An information recording method in a rotating storage apparatus comprising a rotating recording medium for recording information, a head for performing at least a write operation onto said rotating recording medium, and an acceleration sensor for detecting a shock, said method comprising:

outputting a shock out signal if an output from said acceleration sensor exceeds a predetermined threshold;

outputting continuously a signal at a first level during a write inhibit period in response to the input of said shock out signal, wherein said write inhibit period is selected based on said output of said acceleration sensor;

generating a logical AND signal of a logical negation signal of the signal at a first level and a write gate signal output, said write gate signal output being at the first level when a write permission is given; and enabling a write onto said rotating recording medium when said logical AND signal is at the first level.

9. The information recording method according to claim 8, wherein said write inhibit period is varied according to a time span in which said acceleration sensor signal exceeds said threshold or according to an output peak value of said acceleration sensor.

10. The information recording method according to claim 9, wherein said rotating storage apparatus is a hard disk drive.

11. The information recording method according to claim 8, wherein a duration of the write inhibit period is calculated based on a time span in which said acceleration sensor output exceeds said threshold.

* * * * *